United States Patent [19]

Essenmacher et al.

[11] 4,037,198
[45] July 19, 1977

[54] APPARATUS FOR GENERATING DISPLAY ENABLING SIGNALS

[75] Inventors: Albert M. Essenmacher, Livonia; Thomas R. Krause, Troy; James Dishaw, Allen Park, all of Mich.

[73] Assignee: Burroughs Corporation, Detroit, Mich.

[21] Appl. No.: 618,789

[22] Filed: Oct. 2, 1975

[51] Int. Cl.² ............................................. G06K 9/00
[52] U.S. Cl. ............... 340/146.3 ED; 340/146.3 AH; 340/324 A; 340/324 AD
[58] Field of Search ................ 340/146.3 ED, 324 A, 340/324 AD

[56] References Cited

U.S. PATENT DOCUMENTS

| | | | |
|---|---|---|---|
| 3,271,738 | 9/1966 | Kamentsky | 340/146.3 ED |
| 3,439,986 | 4/1969 | Moore | 340/146.3 ED |
| 3,832,682 | 8/1974 | Brok et al. | 340/146.3 ED |
| 3,903,517 | 9/1975 | Hafner | 340/146.3 ED |

OTHER PUBLICATIONS

Heim et al., "Collection of Noncoded Data Fields on an OCR Machine", IBM Tech Disclosure Bulletin, vol. 15, No. 8, Jan. 1973, pp. 2443-2444.

*Primary Examiner*—Leo H. Boudreau
*Attorney, Agent, or Firm*—David R. Syrowik; Ronald L. Taylor; Kevin R. Peterson

[57] ABSTRACT

A method and apparatus for generating display enabling signals representative of unprocessed and processed data streams obtained from a character recognition system for improved identification of minimal quality read signals. The apparatus is operative to generate the display enabling signals concurrently or separately through time as to the unprocessed and processed data streams. The apparatus has the additional capability of being able to operate in a real time state or a delay time state where indefinite display is required.

42 Claims, 4 Drawing Figures

APPARATUS FOR GENERATING DISPLAY ENABLING SIGNALS

CROSS REFERENCE TO RELATED PATENTS

A patent entitled "Character Recognition Techniques" bearing U.S. Pat. No. 3,840,856 and granted Oct. 8, 1974 to William Robert Beall et al and assigned to Input Business Machines, Inc. describes and claims a character recognition system upon which the present invention is an improvement.

BACKGROUND OF THE INVENTION

1. Field of the Invention

This invention relates to a method and apparatus for generating display enabling signals concurrently from the unprocessed and processed data streams of a MICR or OCR character recognition system, and more particularly, to an apparatus that will generate display enabling signals to drive a display system upon receipt of predetermined accumulations or combinations of the unprocessed and processed data streams respectively from the character recognition system.

2. Prior Art

Previous mechanisms having to do with MICR or OCR character recognition systems did not adequately compensate for the relatively high incidence of particularly minimal quality signals being misread or unidentifiably read from encoded documents and thus were passed on as such into the data stream. This resulted in inadequate downstream machine recognition of such minimal quality signals in the data stream that possibly could have been recognized if transformed into a humanly readable format for diagnostic analysis and possible remedial action before being sent further.

Even those systems that may be capable of displaying the data stream as read from the encoded card in a humanly readable format are not adequately capable of allowing any degree of flexibility as to how to key in and capture the misread or unidentifiable signals in the data stream for subsequent display.

Additionally, such systems have lacked reliable means for displaying concurrently the unprocessed and processed data stream of the system representing the input and output respectively of such systems. A related problem of such systems has been the inability to display the unprocessed and processed data streams predeterminably on a real or delay time basis.

SUMMARY OF THE INVENTION

It is an object of the invention to employ digital logic in an apparatus for capturing, by use of keys, segments of both the unprocessed and processed data streams from a character recognition system capable of reading MICR or OCR encoded documents for purposes of generating a plurality of display enabling signals operative to drive a display system.

It is another object of the invention to provide programmed signals as keys for comparing with accumulations of the unprocessed data stream for selecting particular portions of the unprocessed data stream to be captured for an indefinite period for specific diagnostic analysis.

It is yet another object of the invention to provide predetermined processed data stream signals comprising combinations of such signals which, upon identifiably keying in thereon, will capture selected special types of information from the unprocessed data stream for an indefinite period, as above, for specific diagnostic analysis.

It is a further object of the invention to provide a capture of a section of the processed data stream precedent to the supra keys for concurrent display for an indefinite period also for specific diagnostic analysis.

It is yet a further object of the invention to provide the capability for concurrent display of the unprocessed and processed data streams from the character recognition system on a real time basis for on going general diagnostic analysis.

In carrying out the objects of the invention, a character recognition system capable of reading and identifying MICR or OCR encoded signals acts as the source of unprocessed and processed data streams to be inputted to the inventive apparatus for generating display enabling signals through the use of keys to a downstream display stream. The apparatus is operative to allow diagnostic display on a downstream display system of both the unprocessed and processed data streams on a real time basis, display of particular portions of the unprocessed data stream precedent to a programmed key, display of special types of data from the unprocessed data stream as precedent to a preselected key in the processed data stream, and concurrent display of the processed data stream precedent to the supra keys.

BRIEF DESCRIPTION OF THE DRAWINGS

Various other objects, advantages and meritorious features of the invention will become more fully apparent from the following specification, appended claims and accompanying drawing sheets.

The features of a specific embodiment of the invention are illustrated in the drawings, in which.

GENERAL DESCRIPTION OF THE PRIOR ART SYSTEM

Figure 1:
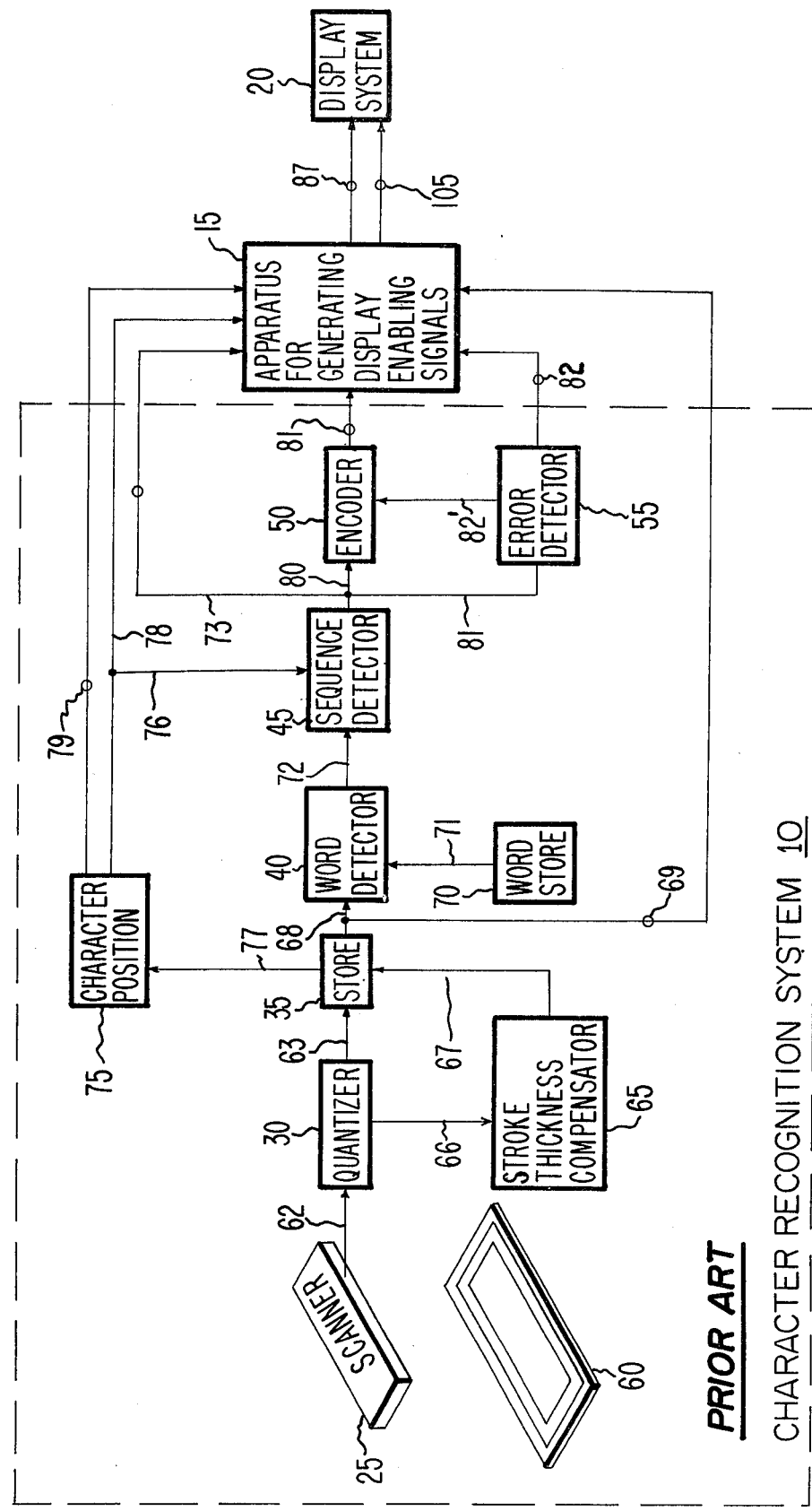
FIG. 1 is a block diagram of the prior art character recognition system and the inventive apparatus for generating display signals.

Referring now to the drawings comprising FIGS. 1 through 5 wherein like component parts are identified by like reference numerals, there is illustrated particularly in FIG. 1 the prior art character recognition system 10 as disclosed in the referenced U.S. Pat. No. 3,840,856 which is used for the purpose of inputting a data stream to the present inventive apparatus 15 for generating display enabling signals to a display system 20. Accordingly, the character recognition system 10 comprises scanner means 25, quantizing means 30, storage means 35, word detecting means 40, sequence detecting means 45, encoding means 50 and error detecting means 55.

The scanning means 25 is in operable communications with a presented character 60 such as an OCR or MICR encoded document and is capable of deriving an array of voltages representative of the configuration of the present character 60. For purposes of describing the illustrated embodiment of the system 10, scanning means 25 will be assumed to be of the optical or OCR type as will be the encoded document 60. The output of scanning means 25 is coupled on line 62 to quantizing means 30. The purpose of the quantizing means 30 is to convert the representative voltage produced by the scanning means 25 to corresponding binary signals. Quantizing means 30 is coupled on line 63 to storage means 35. In addition, stroke thickness compensating means 65 is provided between the quantizing means 30 and the storage means 35 on lines 66 and 67. Stroke thickness compensating means 65 is adapted to compensate for non-uniformities in the presented character 60 that might be deleteriously reproduced by quantizing means 30. Storage means 35 is adapted to store each of the weighted binary signals produced by the multilevel quantizing means 30 to thereby retain field arrays of binary levels, each representing weighted geometric configuration of binary signals that is in approximate conformity with the geometric configuration of presented character 60. The output of storage means 35 on lines 68 and 69 is a serial stream of real time data that could be characterized as an unprocessed data stream. Word detecting means 40 is coupled to storage means 35 on the line 68 and is adapted to examine each discrete area forming each weighted data field geometric configuration to determine if the information content of each examined discrete area is of a predetermined designation. More particularly, the information content of a discrete area is detected as a binary word. The detected binary word is then compared to a plurality of stored predetermined binary words in word storage means 70 on line 71. A favorable comparison therebetween results in a characterization of said detected binary word as one of said predetermined words.

Sequence detecting means 45 is coupled to word detecting means 40 on line 72 and is capable of sensing the order in which each binary word is identified by word detecting means 40. The sequence detecting means 45 is capable of storing a plurality of known sequences, each representing an alphanumeric character of a known type. As each binary word stored in storage means 35 is identified as being one of a predetermined plurality of binary words, the sequence of identified words is compared to each of the stored known sequences. A favorable comparision between a derived sequence and one of the known sequences results in an identification of presented character 60 as being the alphanumeric character associated with the known sequence. In addition to the compared character being outputted on line 80, a command signal indicating that a comparison has been made will be separately outputted on line 73 representing that a compared character as represented by the processed data stream may be available at this exact interval of time. The sequence detecting means 45 is additionally coupled to character positioning means 75 on line 76, the latter being coupled to storage means 35 on line 77. Character positioning means 75 is particularly adapted to sense when the arrays of binary signals serially supplied to storage means 35 are centered therein such that the weighted data field geometric configurations are properly positioned within the storage means 35. When so weighted, the character positioning means 75 applies an enabling signal on lines 76 and 78 to the sequence determining means 45. The sequence detecting means 45 is thus inhibited from recognizing a derived sequence of identified binary words during that period when invalid word identification might occur. The character positioning means 75 thus outputs two types of command signals, one a signal that the character or unprocessed data stream is centered on lines 76 and 78 and the other being a signal on line 79 indicating a period in which characters or the unprocessed data stream may occur.

To provide a translation from the high level human-like intelligible language, outputted by the sequence detector means 45 to a low level machine-like language, an encoder means 50 is provided to be coupled on line 80 to the sequence detector means 45. Encoding means 50 may comprise a conventional coding device capable of producing a unique binary coded signal for each of a plurality of input signals, supplied thereto. The unique binary coded signals comprising data identifiers or a processed data stream outputted in parallel form on line 81 by the encoding means 50 may be used to drive the downstream machine system that it was designed for and additionally the present inventive apparatus 15. Error detecting means 55 is coupled on line 81 to the output of sequence detecting means 45 and is adapted to prevent the erroneous identification of presented character 60 as being more than one predetermined type of alphanumeric character. The error detecting means 55 is further capable of detecting when the presented character 60 does not correspond to any of the known types of alphanumeric characters and, therefore, cannot be positively identified. The one of the outputs of error detecting means 55 is coupled on line 82' to a disable input of encoding means 50 to prevent the encoding means 50 from transmitting a binary coded signal representative of an erroneous character. An additional output on line 82 of the error detecting means 55 represents all the combinations of the processed data stream for which it has been predetermined that diagnosis shall be needed upon the occurrence of such combinations. The predetermined combinations may be created by hard or jumper wiring the error detecting means 55.

GENERAL DESCRIPTION OF THE INVENTIVE APPARATUS

The inventive apparatus 15 itself is disposed to operate in either a real time or a delay time state. In the real time state using the unprocessed data stream display generator 84 of the apparatus 15, the unprocessed data stream on line 69 from the storage means 35 of the character recognition system 10 is allowed to flow relatively unimpaired, in turn, through a first data select module 83 in the apparatus 15, a delay line module 85 in the apparatus 15 on line 86 and finally on line 87 to its own video channel in a separate display stream 20. Concurrently, in the real time state using the processed data system display generator 88 of the apparatus 15, all of the processed data stream from the encoder means 50 of the character recognition system 10 on parallel lines 81 is routed, in turn, to a second data select module 90 in the apparatus 15, a data identifier storage module 95 in the apparatus 15 on line 96, a data identifier translator module 100 in the apparatus 15 on line 101, and again finally on line 105 to its own video channel of the above commonly shared display system 20. The display system 20 may include such components as a common oscilloscope having multichannel video inputs, control generators (not shown), and a display device such as a cathode ray tube (not shown) for concurrent display of the unprocessed and processed data streams.

In the delay time state it may be desired to display selected sections of the unprocessed and processed data streams indefinitely. Control, in this state, may be had either by hardware or software modes. Using the hardware mode, the error detecting means 55 in the character recognition system 10 may be hard or jumper wired to recognize preselected combinations of the processed data stream as keys and channels off the keyed combinations on line 82 to a separate input of the first data select module 83 in the apparatus 15. The keyed combination will enable the first data select module 83 in the apparatus 15 to order the delay line module 85 in the apparatus 15 to feedback on itself and thus capture special types of the unprocessed data stream precedent to that keyed combination which will usually be back to the start of an encoded print line as read by the scanner means 25 of the character recognition system 10. All of the unprocessed data stream subsequent to the keyed combinations will be excluded thereafter as long as that mode is operative. The captured special types of the unprocessed data stream will then be inputted to the downstream display system 20 on line 87.

In the software mode, a particular portion of the unprocessed data stream may be chosen for display by programming a key signal in an operator control module 110 in the apparatus 15 to be outputted on lines 111 and 112. The unprocessed data stream on line 69 from the store means of the character recognition system 10 may be fed into the first data select module 83 in the apparatus 15 for stored accumulation and comparison to the programmed key signal. When a true comparison is made, the delay line module 85 in the apparatus 15 is again enabled to feedback on itself and send on line 87 the captured particular portion of the unprocessed data stream to the display system 20 as before.

In both the hardware and software modes of the delay time state, all of the processed data stream contained in the section informationally equivalent to the captured unprocessed data stream and precedent to one of the supra keys may be displayed concurrently with the above mentioned captured particular portions or special types of the unprocessed data stream on the display system 20 which as indicated supra has multichannel inputs. This is accomplished by allowing the first data select module 83 in the apparatus 15 as enabled by its output signal on line 86 to the delay line module 85 in the apparatus 15 to arm a control circuit module 115 in the apparatus 15. The armed control circuit module 115 will be operative to preclude, on line 120, the second data select module 90 in the apparatus 15 from receiving subsequent sections of the processed data stream on line 81 from encoder means 50 of the character recognition system 10. As such, the control circuit module 115 in the apparatus 15 will then via control line 125 only allow sections of the processed data stream already residing in the data identifier storage module 95 in the apparatus 15 to be inputted back into itself and thus be captured. The captured section of the processed data stream is then fed on line 101, as in the real time state, to the data identifier translator module 100 in the apparatus 15 and then, as before, on line 105 to the display system 20.

DETAILED DESCRIPTION OF THE INVENTIVE APPARATUS

Figure 2:
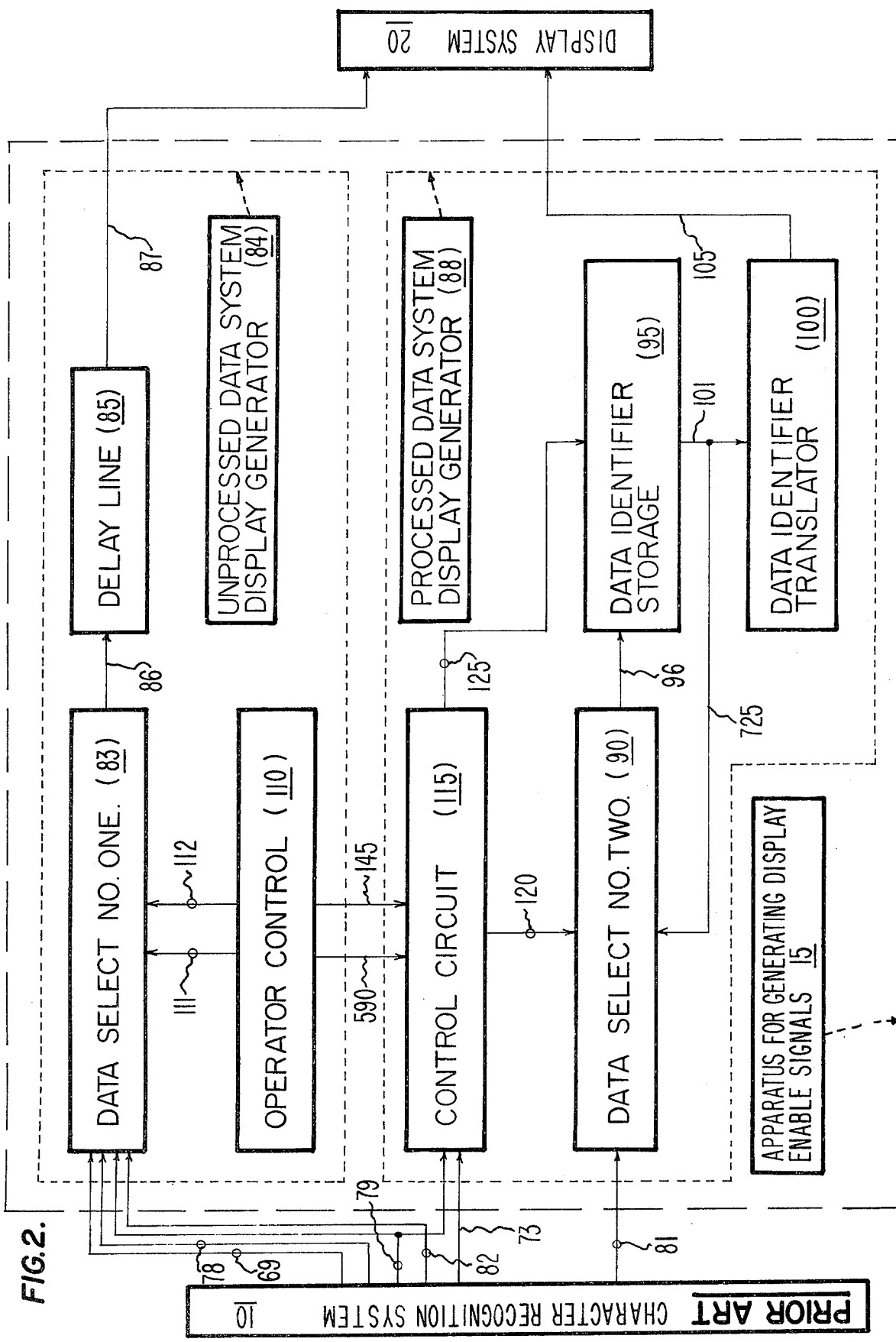
FIG. 2 is a block diagram of the inventive apparatus for generating display enabling signals as illustrated in FIG. 1.
Figure 3:
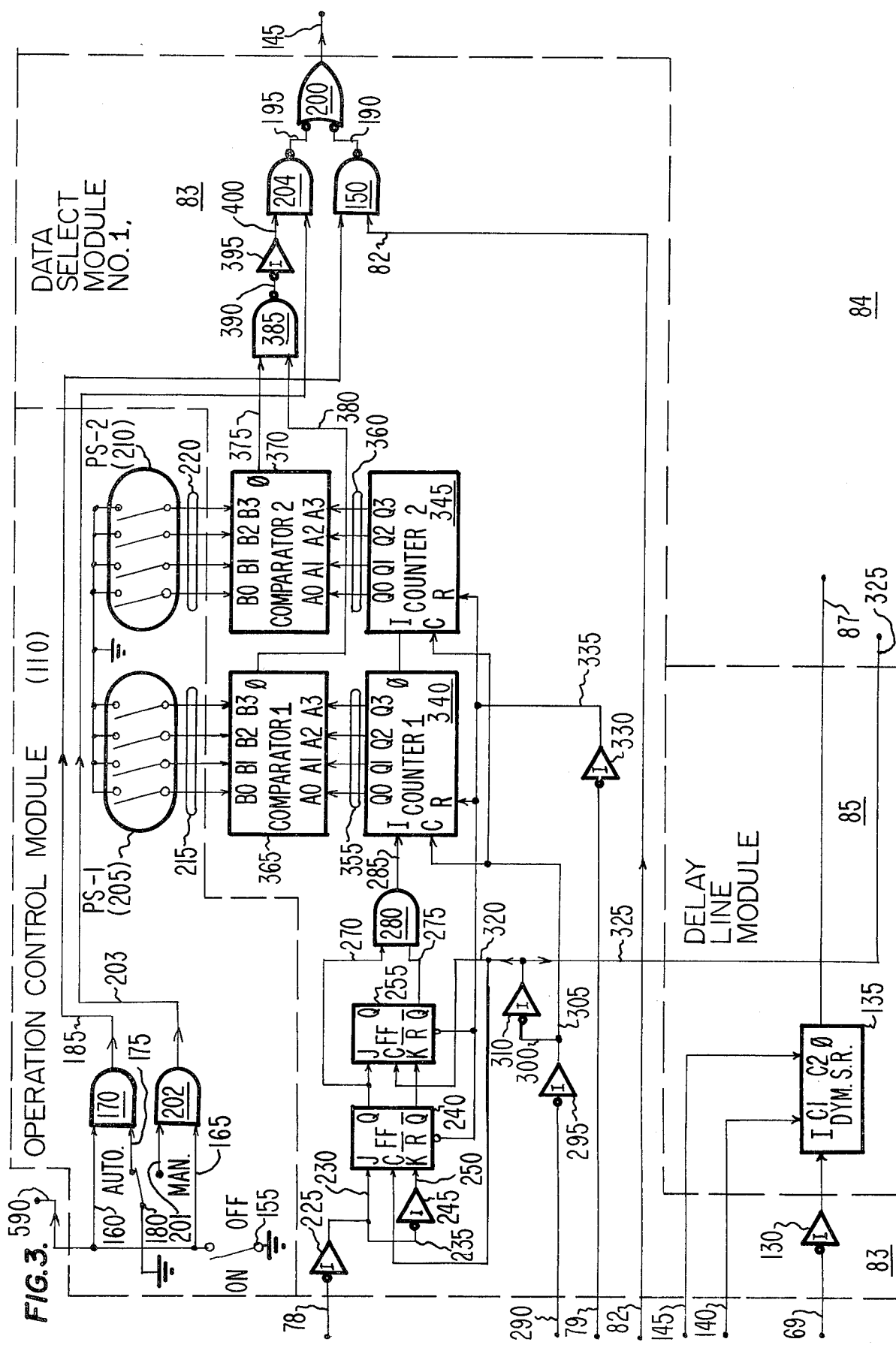
FIG. 3 is a block diagram of the unprocessed data stream display generator illustrated in FIG. 2.

Specifically describing the unprocessed data stream display generator 84 of the apparatus 15 illustrated generally in FIG. 2 and particularly in FIG. 3, the processed data stream on line 69 from store means 35 has its polarity reversed by an inverter 130 in the first data select module 83 before being sent on line 86 to the dynamic shift register 135 in the delay line module 85. The dynamic shift register (dym. S.R.) 135 in the real time state is operative to storably slow the travel of the unprocessed data stream as it inputs to terminal I and outputs at terminal 0 at a rate determined by the number of stages in the register 135 and the clock rate applied by a clock (not shown) on line 140 to terminal C1 of the register 135. In the delay time state when the C2 terminal is enabled by a signal on line 145 from the first data select module 83, the register 135 will continue to output as before from terminal 0 on line 87, as a video signal to a first channel input in the display system 20 but will cease to receive new input at terminal I and will only recycle the data aready stored in the register 135. The preferred dynamic shift register 135 is a National Semiconductor Corp. model MM1404.

The delay time state in the unprocessed data stream display generator 84 is made operable when it is desired to capture a section of the unprocessed data stream. The capture is made upon occurrence of a preselected key to thus enable the captured section to be displayed indefinitely. Such a capture may be made in either a hardware or software mode designating an automatic (auto) or manual (man) response, respectively. The hardware mode may be had by wiring the error detection module 55 to respond to preselected combinations of the processed data stream to automatically output, upon the occurrence thereof, an error or key signal on line 82 to a NAND gate 150 in the first data select module 83. This presupposes that a grounded SPST on-off switch 155 is disposed "on" and will output on lines 160 and 165 and particularly on line 160 to AND gate 170. As will be seen infra, when switch 155 is "on" or "off," the delay or real time state is enabled, respectively. AND gate 170 will be true when inputted to by supra line 160 and also line 175 from a grounded SPDT mode select switch 180 when disposed in its "auto" position where the "auto" and "man" positions are mutually exclusive. The true AND gate 170 will output on line 185 to NAND gate 150. Gate 150 will, in turn, output on line 190 when both lines 185 and 82 input thereto. NOR gate 200 will output on line 145 when receiving an ouput from either of lines 190 and 195. A signal on line 145 to the dynamic shift register 135 will, as mentioned supra, cause the register 135 to recycle back on itself thus causing a fixed display in the hardware mode of the delay time state. The true effect of such recycling is to give all the information for diagnostic purposes back to at least as far as the last start of line of characters such as a print line, or other arbitrary predetermined segmentation as read and identified by the character recognition system 15.

In the software mode of the delay time state of the unprocessed data stream display generator 84, the key signal may be programmed in manually to preselect the section of the unprocessed data stream to be captured and displayed indefinitely. This mode is initialized by again turning "on" the switch 155, setting mode switch 180 to "man" to output on line 201 thus enabling AND gate 202 to output on line 203 to NAND gate 204. The pair of sets of grounded programming switches PS-1 (205) and PS-2 (210) are set, according to a preselected code, to give a key signal collectively on sets of lines 215 and 220 representative of an accumulation of data from the unprocessed data stream from the beginning of a line to a preselected key in point on the line. The accumulation, to which the key signal on lines 215 and 220 is to be compared, is generated by using the command centering signal on line 78 from the character positioning means 75 as an incremental trigger. The signal on line 78 to inverter 225 is then bifurcated on lines 230 and 235 to the J input terminal of flip flop (FF) 240 and inverter 245, respectively. Then through line 250, the inverter 245 feeds the K input terminal of flip flop 240. The flip flops 240 and 255 are regular J-K flip flops. The output terminals Q—$\overline{Q}$ of flip flop 240 serially feed the J-K input terminals of flip flop 255 on lines 260 and 265, respectively. The Q output terminal and $\overline{Q}$ output terminal of flip flops 240 and 255 are then fed on lines 270 and 275, respectively, to AND gate 280 which will output upon the concurrent receipt thereof on line 285.

For clock triggering purposes, a signal from a clock (not shown) is sent on line 290 to inverter 295 where it is bifurcated on lines 300 and 305. The clock signal travels on line 305 through inverter 310 and is then outputted trifurcated on lines 315, 320 and 325. Lines 315 and 320 input to the C or clocking terminals of flip flops 240 and 255, respectively. Line 325 proceeds to the display system 20 to be used as clocking input for the first channel video signal on line 87 to the display unit 20 from the delay line module 85. Inputting to the first data select module 83 is a signal on line 79 from the character positioning means 75, as indicated supra, indicates a period when signals representative of the unprocessed data stream may occur or more specifically when a period is occurring when a line of characters may actually be in the process of being read. The negation of this is the relatively short period when no characters are being read or the unprocessed data stream does not occur. The line 79 is inverted by inverter 330 to achieve the supra mentioned negation and proceeds on line 335 to the R or reset terminals of flip flops 240 and 255, and additionally to first and second counters 340 and 345. The preferred counter to be used each for 340 and 345 is a Texas Instrument model 74161. Incrementing signals are sent on line 285 to the input "I" terminal of counters 340 and 345. Counter 340 increments counter 345 via line 350. The counters 340 and 345 are clocked on supra mentioned line 305. Each stage of each of the counters 340 and 345 is sampled and sent in parallel fashion by sets of lines 355 and 360 to first and second comparators 365 and 370, respectively. The preferred comparators 365 and 370 are each Texas Instrument model 7485. The parallel inputs of the first and second comparators 365 and 370 sample the paired sets of lines "215 and 355" and "220 and 360", respectively. When a compare is made, the serial Q output terminals of comparators 365 and 370 proceed on lines 375 and 380, respectively, to NAND gate 385 which upon the concurrent receipt thereof proceeds on line 390 to inverter 395. The signal from the inverter 395 is then sent on line 400 to the supra mentioned NAND gate 204.

The incrementing operation in the software mode of the delay time state proceeds by inputting the supra mentioned unprocessed data stream on line 78 from the character position means 75 to the flip flops 240 and 255 which act to synchronize the unprocessed data stream to the flip flop clock rate given on lines 315 and 320. When simultaneously clocked and inputted thereto, the flip flops 240 and 255 will always be in opposite stages. The flip flop circuit described supra of which flip flops 240 and 255 is a part of a common circuit and is shown and described on pages 79 and 80 under the subheading of shift registers in a book titled "Computer Data Handling Cicuits" by Alfred Corbin and was published in 1971 by Thomas Sam Publications. Once the unprocessed data stream is so synchronized, it may proceed through lines 270 and 275 to AND gate 280 to be outputted on line 285 to counters 340 and 345 which share the same clock and thus may be used to synchronously increment the counters 340 and 345. Counters 340 and 345 each count to nine with the first counter 340 being serially connected to the second counter 345 thus enabling the counters to incrementally count to a maximum two digit number of 99. Once the counters 340 and 345 have been reset by a no read signal on line 79, and additionally the switches PS-1 (205) and PS-2 (210) have been set for a key signal anywhere between zero and the maximum two digit number, the comparators 365 and 370 will continuously compare the incrementing counters 340 and 345 to the switches 205 and 210 until each of the comparators 365 and 370 registers a true compare at their output Q terminals as sensed by NAND gate 385. The true compare signal will be sent on line 145 to the delay line module 85 to recycle the stored unprocessed data stream as was done supra in the hardware mode of the delay time state.

Figure 4:
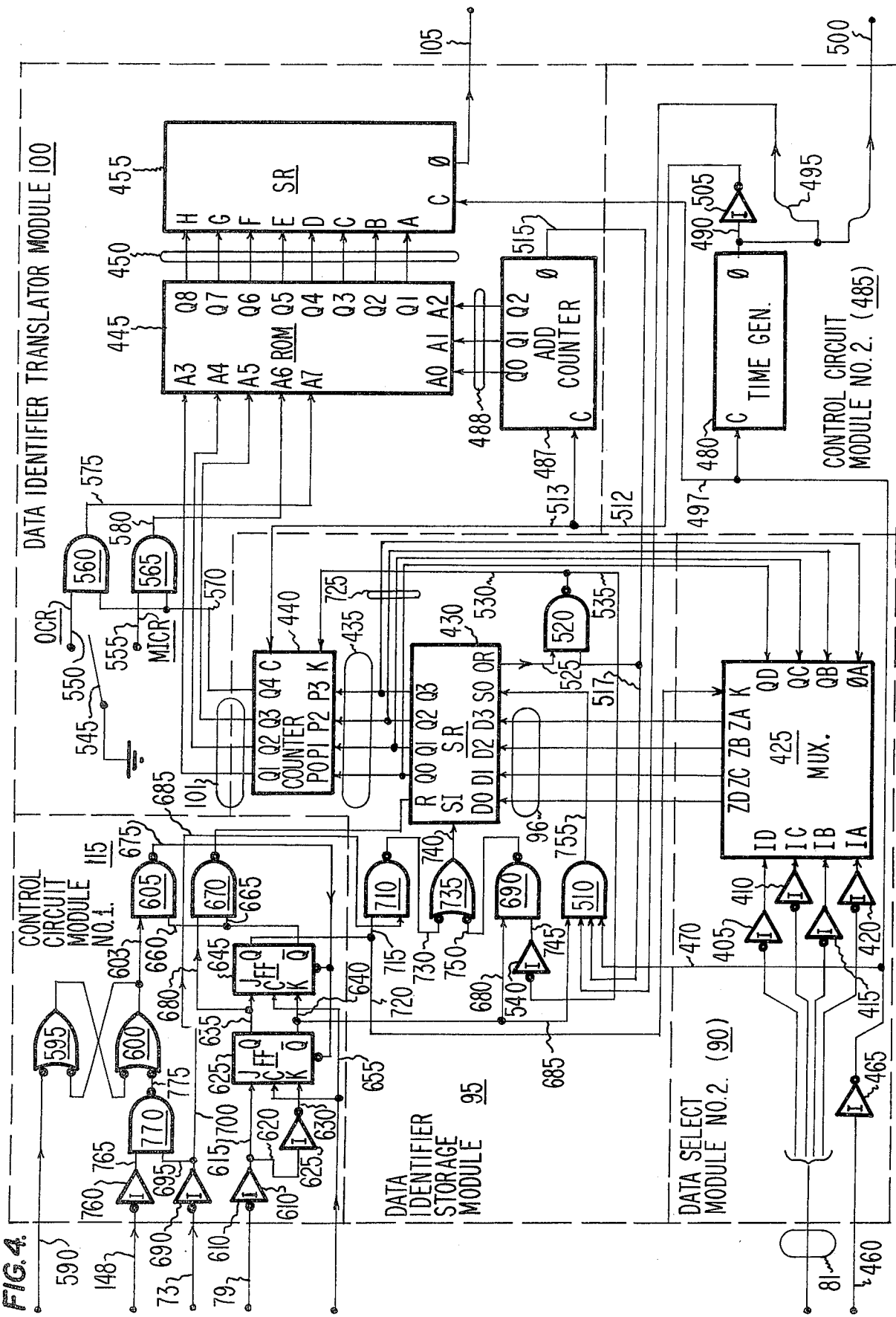
FIG. 4 is a block diagram of the processed data stream display generator illustrated in FIG. 2.

In the real time state of the processed data stream display generator 88 of the apparatus 15 as shown in FIG. 4, the processed data stream or data identifiers on the parallel set of lines 81 from the encoder means 50 are inputted through inverters 405, 410, 415 and 420 to a routing multiplexer (mux) 425 in the second data select module 90. The preferred multiplexer 425 is a Texas Instrument model 74157. From there, the signal is channeled via set of lines 96 to a storage shift register (SR) 430 in the data identifier storage module 95. The preferred shift register 430 is a Texas Instrument model 3341. The signals, in turn, are directed via set of lines 435 to an interface counter 440 also in module 95. The preferred counter 440 is a Texas Instrument model 74161. Next, the signals are sent through set of lines 101 to the inputs of a read only memory (ROM) 445 in the data identifier translator module 100. The preferred ROM 445 is a National Semiconductor Corp. model 1702A. Then the signals are inputted on line set 450 to a "parallel to serial" shift register 455. The preferred shift register 455 is a Texas Instrument model 74165. The serial output of the shift register 455 is sent on line 105 as a video signal to a second channel input in the display system 20. The result of the supra state is to give a real time display of the processed data stream as it leaves the character recognition system 10.

The clocking circuit for the supra processed data stream display generator 88 comprises a clock (not shown) outputting a signal on line 460 to an inverter 465 in the second data select module 90. The inverter 465 outputs on trifurcated lines 470, 475, and 477. The clock signal on line 475 inputs to a clock terminal C of a time generator 480 in a second control circuit 485. The preferred time generator 480 is a counter made by Texas Instrument model 74161. The time generator 480 provides a relatively slower clock rate to synchronize the interface counter 440 and an address counter 487 as to each other when they interact on parallel line sets 101 and 488, respectively, with the ROM 445 as will be seen infra. The preferred counter 487 is a Texas Instrument model 74161. The time generator 480 trifurcatably outputs on lines 490, 495 and 500 and inverter 505, to an AND gate 510 in the data identifier storage module 95, and to a clocking input for the second channel video signal of line 105, respectively. The AND gate 510 is also adapted to receive an input from the supra clocking line 470.

As mentioned supra, the time generator 480 acts to synchronize via bifurcated clocking lines 512 and 513 both from inverter 505, the interface counter 440 and the address counter 487 respectively as to each other and delayably synchronize as to the other modules in the apparatus 15. The interface counter 440 is a device for generating a variable relative address through its count cycle dependent on the parallel input initializing by the storage shift register 430 per any given line of print being read corresponding to an arbitrary segmentation between system resets as will be seen infra. The address counter 487, on the other hand, is a device for generating a fixed relative address through a count cycle with a constant initialization. The combined variable and fixed relative addresses generated by counters 440 and 487, respectively, are operative to uniquely access the ROM 445 so as to output on line set 450 to the "parallel to serial" shift register 455 which is synchronously clocked on supra line 477 at the same synchronized rate as the address generator 487. The address counter 487 is further operative to give a synchronized pulse at the end of each count cycle through its serial output 0 on bifurcated lines 515 and 517 to a NAND gate 520 and also the AND gate 510, respectively. The NAND gate 520 is also adapted to receive an input on line 525 from the output read (OR) terminal of the storage shift register 430. The output ready terminal will output whenever the shift register 430 detects stored data therewithin. Concurrent receipt of signals at its inputs by the NAND gate 520 will enable an output signal to be sent on bifurcated lines 530 and 535 to the K terminal of the interface counter 440 and an inverter 540, respectively. Receipt of a signal at the K terminal of the interface counter 440 will enable the counter 440 to receive signals at its inputs.

The apparatus 15 is operative to have a scanner type mode selection circuit in the data identifier translator module 100 for flexible manual switching into either an OCR or MICR reader environment at will. This is accomplished through a grounded SPDT switch 545 operative to select OCR in its high state or MICR in its low state and thus output on lines 550 or 555 to AND gates 560 to 565, respectively. The gates 560 and 565 are in a ready condition whenever a control signal is outputted on line 570 from the high parallel stage output terminal Q3 of the interface counter 440. The Q3 terminal is enabled whenever there is data incrementing the counter 440. Once either the AND gate 560 or 565 is put into a true state, a signal on line 575 or 580 will be sent to the A7 or A6 input terminals of the ROM 445 to condition it accordingly to an OCR or MICR state, respectively.

The first control circuit module 115 enables the delay time state for the Processed Data Stream Display Generator 88 and also disables delay time state for real time operation as desired. In the real time state, an "off" signal indicating no delay time from switch 155 in the operator control module 110 is sent via line 590 to a stop latch circuit comprising cross connected NOR gates 595 and 600 which act to disable the stop latch. When so disabled, a signal will be sent to NAND gate 605 on line 603. The supra described signal indicating a period or read interval in which characters or data in the processed data stream may occur is inputted on line 79 to an inverter 610 which in turn bifurcatably outputs on lines 615 and 620 to the J terminal of a conventional J-K flip flop 625 and an inverter 625, respectively. The inverter 625, in turn, outputs on line 630 to the K terminal of flip flop 625. Flip flop 625 is serially connected through its outputs on lines 635 and 640 to the inputs of another J-K flip flop 645.

The flip flops 625 and 645 are both clocked by a clock (not shown) on bifurcated line 650 and 655, respectively. As before in the previous flip flop circuit of 240 and 255, when not inputted to, the flip flops 625 and 645 will both clock down to their low states. When regularly clocked, the flip flops 625 and 645 will alternately be in opposite states, but unlike as before, the input to the flip flops 625 and 645 does not regularly alternate, but rather once on, stays on for a relatively long period corresponding to that interval of time in which characters or the processed data stream as read may be available. As such, once an input signal is applied to the flip flops 625 and 645, they will go from both being low to the first 625 being high and the second 645 being low, to finally both being high for the duration of the period of the signal on line 79 after which both flip flops 625 and 645 will be affirmatively reset to low or with the absence of input they will de-facto both be clocked back to a low state.

In a typical operative case in the real time state of the Processed Data Stream Display Generator 88 where both flip flops 625 and 645 are initially low, signals will be sent by low flip flop 645 on bifurcated lines 660 and 665 to the NAND gate 605 and also a NAND gate 670. Subsequently, when the stop latch 595 and 660 is disabled by a signal on line 590 from operator control 110, it may be assumed that a real time state is affirmatively desired. Gate 605 will thus remain false for the interim and will not reset the flip flops 625 and 645 through line 675. Instead, when a signal appears on supra described line 79 indicating a character available period, the flip flops 625 and 645 will begin to increment with flip flop 625 high and flip flop 645 low after the first clock. This will set gate 670 true through lines 680 and 665 to output on line 685 to reset the storage shift register 430 to zero for the new line of read characters coming in representing the processed data stream. The next clock pulse puts both flip flops 625 and 645 high. At this point, it is assumed that there is a signal coming in on line 73 through inverter 690 and out on bifurcated lines 695 and 700 to gates 705 and 710, respectively, representing that a compared character may be available at this precise interval as described supra.

With flip flop 645 outputting high on bifurcated lines 715 and 720 to NAND gate 710 and routing multiplexer 425, respectively, gate 710 will be made true and multiplexer 425 will be directed to receive new processed data stream input, and not feedback old input on line set 725 from output line set 435. When gate 710 is true, it will output on line 730 to NOR gate 735 and out on line 740 to the shift input (SI) of the storage shift register 430 thus enabling the register 435 to receive input from multiplexer 425 on line set 96. Once the period of the signal on line 79 expires indicating an end of line or termination of a character availability period, the flip flops 625 and 645 will clock themselves low again. With the flip flops 625 and 645 low, gates 690 and 510 will begin to be clocked true through lines 745 and 470-517-495 to output on lines 750 and 755 to shift-in and shift-out out respectively of the register 430.

When a delay time state in the Processed Data Stream Display Generator 88 is operatively desired, a signal on line 145 from the first data select module 83 is received and sent through inverter 760 and out on line 765 to NAND gate 770 and then on line 775 to the stop latch 595 and 600. This enables the stop latch 595 and 600 which, in turn, sends a signal to gate 605. At this point, all operative action will cease until the end of the read line is reached and the signal on line 79 is removed thus enabling flip flops 625 and 645 to begin clocking down. Once this occurs and after the first clock thereafter, flip flop 625 will be low and flip flop 645 high. This will enable gate 510 to be clocked true thus enabling storage shift register 430 to output again. Gates 690 and 735 will be clocked true thus enabling the storage shift register 430 to also again input. The subsequent clock to the flip flops 625 and 645 will place them both in a low state. This will set gate 605 true and thus lock the flip flops 625 and 645 into a low state reset condition immune to any further input on line 79 until stop latch 595 and 600 is again disabled by a signal from operator control 110 on line 590. Until such disabling, the delay time state will continue to allow the storage shift register 430 to feedback on itself and thus display the stored or captured read line of the processed data stream or data identifiers indefinitely.

While the above referenced embodiments of the invention have been described in considerable detail, it will be appreciated that other modifications and variations therein may be made by those skilled in the art without departing from the true spirit and scope of the invention.

What is claimed is:

1. A method for generating display enabling signals for display, the method being operative to receive a processed data stream as identified from an unprocessed data stream read from characters on an encoded document, comprising the steps of:
   a. receiving the unprocessed data stream as read for outputting in one of a real time state and a delay time state a video signal for display when one of a hardware mode and a software mode is selected to respond to a predetermined segment in the unprocessed data stream, and for outputting control signals when in a delay time state indicative of the predetermined segment to be captured in the unprocessed data stream; and
   b. obtaining the processed data stream for outputting the processed data stream as a video signal for display in one of a real time state and a delay time state as controlled by delay time state signals thus enabling capture of analogous sections of the unprocessed and processed data streams as read and identified.

2. An improved method for connecting signals from an encoded document for display comprising the steps of:
   a. reading characters from an encoded document and producing a corresponding unprocessed data stream and a corresponding processed data stream;
   b. receiving the unprocessed data stream as read for outputting in one of a real time state and a delay time state a video signal for display when one of a hardware mode and a software mode is selected to respond to a predetermined segment in the unprocessed data stream, and for outputting control signals when in a delay time state indicative of the predetermined segment to be captured in the unprocessed data stream; and
   c. obtaining the processed data stream for outputting the processed data stream as a video signal for display in one of the real time state and the delay time state as controlled by delay time state signals thus enabling capture of analogous sections of the unprocessed and processed data streams as read and identified.

3. An improved method for deriving signals from an encoded document for display comprising the steps of:
   a. reading characters from an encoded document and producing an analogous unprocessed data stream and an analogous processed data stream;
   b. receiving the unprocessed data stream as read for outputting in one of a real time state and a delay time state a video signal when one of a hardware mode and a software mode is selected to respond to a predetermined segment in the unprocessed data stream, and for outputting control signals when in a delay time state indicative of the predetermined segment to be captured in the unprocessed data stream;
   c. obtaining the processed data stream for outputting the processed data stream as a video signal in one of the real time and the dalay time state as controlled by delay time state signals thus enabling capture of analogous sections of the unprocessed and processed data streams as read and produced; and
   d. deriving unprocessed data stream video signals and processed data stream video signals separately for simulatenous display thereof.

4. An apparatus for generating display enabling signals to a display system, the apparatus having as a processed data stream source a character recognition system operative to identify the unprocessed data stream read from characters on an encoded document comprising:
   a. unprocessed generator means disposed to receive the unprocessed data stream from the character recognition system for outputting in one of a real time state and a delay time state to the display system said apparatus having at least one of a hardware mode and a software mode in which one of said modes said unprocessed generator means is responsive to a predetermined segment in the unprocessed data stream, and for outputting control signals when in a delay time state indicative of the predetermined segment to be captured in the unprocessed data stream; and
   b. processed generator means operative to receive the processed data stream from the character recognition system for sending the processed data stream to the display system in one of the real time state and the delay time state as controlled by delay time state signals from said unprocessed generator means thus enabling capture of analogous sections of the unprocessed and processed data streams from the character recognition means.

5. An improved mechanism for deriving signals from an encoded document for display comprising:
   a. character recognition means for reading characters from an encoded document and producing an analogous unprocessed data stream and an analogous processed data stream;
   b. unprocessed generator means disposed to receive the unprocessed data stream from said character recognition means for outputting in one of a real time state and a delay time state a video signal said apparatus having at least one of a hardware mode and a software mode in which one of said modes said unprocessed generator means is responsive to a predetermined segment in the uprocessed data stream, and for outputting control signals when in the delay time state indicative of the predetermined segment to be captured in the unprocessed data stream;

c. processed generator means operative to receive the processed data stream from said character recognition means for outputting the processed data stream as a video signal in one of the real time state and the delay time state as controlled by delay time state signals from said unprocessed generator means thus enabling capture of analogous sections of the unprocessed and processed data streams from said character recognition means; and d. display means operative to separatively receive unprocessed data stream video signals and processed data stream video signals from said unprocessed generator means and said processed generator means respectively for simultaneous display thereof.

6. An improved device for generating signals from an encoded document for a display system comprising:

a. character recognition means for reading characters from an encoded document and producing an analogous unprocessed data stream and an analogous processed data stream;

b. unprocessed generator means disposed to receive the unprocessed data stream from said character recognition means for outputting in one of the real time state and the delay time state a video signal to the display system said apparatus having at least one of a hardware mode and a software mode in which one of said modes said unprocessed generator means is responsive to a predetermined segment in the unprocessed data stream, and for outputting control signals when in a delay time state indicative of the predetermined segment to be captured in the unprocessed data stream;

c. processed generator means operative to receive the processed data stream from said character recognition means for sending the processed data stream as a video signal to the display system to be simultaneously displayed with the unprocessed data stream video signal in one of the real time state and the delay time state as controlled by delay time state signals from said unprocessed generator means thus enabling capture of the analogous sections of the unprocessed and processed data streams from said character recognition means.

7. In a device for generating signals from an encoded document as described in claim 6 wherein said unprocessed generator means comprises:

a. operator control means for setting the time state to one of a real time state and a delay time state, for selecting in the delay time state one of an auto mode and a manual mode of capture of the unprocessed data stream received from said character recognition system to output a control signal indicative thereof, and for outputting a programmed key signal in the manual mode indicative of the desired capture section in the unprocessed data stream;

b. first data select means operative to receive the unprocessed data stream from said character recognition system for accumulatively comparing the unprocessed data stream with the programmed key signal and outputting a delay time control signal when concurrently a true compare thereof is made and a manual mode control signal is received from said operator control means, and for allowing a delay time control signal to be outputted when concurrently an auto control signal is received from said operator control means and key signal is received from said character recognition system indicating that a predetermined combination of signals of the processed data stream has been detected; and c. delay line means for storably delaying the unprocessed data stream as it is clocked therethrough to the display system and for terminating new input from the unprocessed data stream from being received by said delay line means and recyclably outputting to the display system that which was precedingly stored therein upon receipt of the delay time control signal from said first data select means.

8. In a device for generating signals from an encoded document as defined in claim 7 wherein said character recognition means further includes means for outputting signals in the delay time state indicative that the read character is centered as represented by the unprocessed data stream in the manual mode and indicative that a predetermined combination of signals in the processed data stream has occurred in the auto mode, and for outputting signals when a read period has begun in which characters may occur as represented by the unprocessed data stream and when the exact interval occurs designating that a character may be available as represented by the processed data stream.

9. In a device for generating signals from an encoded document as defined in claim 8 wherein said operator control means comprises:

a. first switching means for selecting one of the real time state and delay time state for said device;

b. second switching means for selecting the manual mode or the auto mode when said first switching means is selected to be in the delay time state; and c. gating means for outputting unique control signals when said first switching means is selected to be in the delay time state and said second switching means is selected to be one of the manual mode and the auto mode.

10. In a device for generating signals from an encoded document as defined in claim 9 wherein said operator control means comprises third switching means for selecting a programmed key signal cooperatively made operative by the manual mode of said second switching means and the delay time state of said first switching means.

11. In a device for generating signals from an encoded document as defined in claim 9 wherein said first switching means of said operator control means is a SPST switch grounded at one end.

12. In a device for generating signals from an encoded document as defined in claim 9 wherein said second switching means of said operator control means is a SPDT switch grounded at one end.

13. In a device for generating signals from an encoded document as defined in claim 9 wherein said gating means comprises a pair of AND gate.

14. In a device for generating signals from an encoded document as defined in claim 10 wherein said third switching means of said operator control means comprises two pairs of four SPST switches grounded at one end.

15. In a device for generating signals from an encoded document as defined in claim 4 wherein said first data select means comprises:

a. flip flop means operative to inputtably receive the centering signal representative of the unprocessed data stream from said character recognition means for synchronizing the centering signal to a predetermined clock rate after being reset by a negation of the read period signal from said character recognition means;

b. gating means operative to sample said flip flop means at a fixed point after the arrival of the centering signals in relation to said flip flop means clock rate;

c. counter means operative to receive a signal from said gating means for accumulatingly clocking in the synchronized centering signal representative of the unprocessed data stream after being reset by a negation of the read period signal from said character recognition means;

d. comparator means operative to receive the accumulated signal from said counter means for continuous comparison with the programmed key signal of said operator control means and for outputting a signal upon true compare thereof; and e. first gating means for outputting the delay time control signal upon a first concurrent receipt of the manual mode control signal from said operator control means and the true compare signal from said comparator means and for outputting the delay time control signal upon a second concurrent receipt of the auto mode control signal from said operator control means and the predetermined combination signal from said character recognition means.

16. In a device for generating signals from an encoded document as defined in claim 15 wherein said flip flop means of said first data select means comprises a pair of serially connected first and second J-K flip flops each having a high and a low state.

17. In a device for generating signals from an encoded document as defined in claim 15 wherein said flip flop means of said first data select means further comprises AND gating means for sampling the high state of the first flip flop and the low state of the second flip flop for disposition as the output of said flip flop means.

18. In a device for generating signals from an encoded document as defined in claim 15 wherein said counter means comprises a pair of serially connected counters each having multistages with parallel outputs leading to said comparator means.

19. In a device for generating signals from an encoded document as defined in claim 15 wherein said comparator means comprises a pair of comparators with serial outputs and each with two sets of parallel inputs for receiving manual mode key signals in parallel form from said operator control means and parallel output signals from said counter means.

20. In a device for generating signals from an encoded document as defined in claim 19 wherein said comparator means further comprises second gating means receiving sampling inputs from the serial outputs of each of said pair of counters for action as the output of said comparator means.

21. In a device for generating signals from an encoded document as defined in claim 20 wherein said second gating means comprises a NAND gate.

22. In a device for generating signals from an encoded document as defined in claim 15 wherein said first gating means comprises a first NAND gate for inputting a first concurrent receipt of signals thereto, a second NAND gate for inputting a second concurrent receipt of signals thereto, and an NOR gate for receiving the output signals from said first and second NAND gates for outputting the delay time control signal thereupon.

23. In a device for generating signals from an encoded document as defined in claim 7 wherein said delay line means is a dynamic shift register.

24. In an apparatus for generating display enabling signals as described in claim 8 wherein said processed generator means comprises:

a. second data select means for receiving at a first set of inputs the processed data stream from the character recognition system and outputting the processed data stream unchanged and for alternatively receiving a feedback processed data stream from a second set of inputs upon receipt off a delay time control signal from said unprocessed generator means and outputting the captured section of the processed data stream again unchanged; and b. storage means for receiving the processed data stream from the second data select means and delaying storing the processed data stream before bifurcatably outputting to the display system and the second set of inputs of said second data select means as a feedback loop in the delay time state.

25. In an apparatus for generating display enabling signals as defined in claim 24 wherein said character recogition means further includes means for outputting signals in the delay time state indicative that the read character is centered as represented by the unprocessed data stream in the manual mode and indicative that a predetermined combination of signals in the processed data stream has occurred in the auto mode, and for outputting signals when a read period has begun in which characters may occur as represented by the unprocessed data stream and when the exact interval occurs designating that a character may be available as represented by the processed data stream.

26. In a device for generating signals from an encoded document as described in claim 25 wherein said processed generator means further includes control circuit means comprising:

a. stop latch means for transforming the delay time control signal from said first data select means from a relatively short pulse to a signal of indefinite period upon a first concurrent enabling receipt of the delay time control signal and the exact interval character available signal from said character recognition means, said stop latch means is operative to be disenabled upon receipt of a signal from said operator control means indicating that the time state has been conditioned to be a real time; and b. flip flop means operative to receive as an input the read period signal from said character recognition means for outputting sequentially in an alternative manner as it is clocked at a predetermined rate.

27. In a device for generating signals from an encoded document as described in claim 26 wherein said flip flop means comprises a pair of serially coupled first and second flip flops each having high and low states and operative to always be in opposite states while being clocked, said pair of flip flops further having coupled resets operative to set both said flip flops in a low state simultaneously, said second flip flop in its high state being able to disallow said data select means from feeding back on itself.

28. In a device for generating signals from an encoded document as described in claim 26 wherein said stop latch means is a pair of cross connected NOR gates.

29. In a device for generating signals from an encoded document as described in claim 26 wherein said stop latch means further comprises first gating means for inputting to said stop latch means for enabling it upon concurrent receipt of the first concurrent receipt thereto.

30. In a device for generating signals from an encoded document as described in claim 29 wherein said first gating means of said stop latch means is a NAND gate.

31. In a device for generating signals from an encoded document as described in claim 27 wherein said control circuit means further comprises:
 a. first gating means operative to output upon concurrent receipt of the enabling signal from said stop latch means and the low state signal from said second flip flop and
 b. second gating means operative to output upon concurrent receipt of the high state signal from said first flip flop and the low state signal from said second flip flop.

32. In a device for generating signals from an encoded document as described in claim 31 wherein said storage means further comprises:
 a. shift register means operative to receive the output signal from said second data select means for delayably storing then outputting; and
 b. interface counter means operative to receive as an initializing the outputted signal from said shift register means for conversion to a variable address as said interface counter means proceeds through its count cycle for outputting a representation thereof.

33. In a device for generating signals from an encoded document as described in claim 32 wherein said storage means further comprises:
 a. first gating means operative to receive the outputted signal from the high stage of said second flip flop and the exact interval character available signal from said character recognition, means; and
 b. second gating means operative to receive the outputted signal from said first gating means to in turn output to said shift register means to enable it to shift in data from the output of said second data select means.

34. In a device for generating signals from an encoded document as described in claim 33 wherein said control circuit means further comprises time generator means operative to output a clock signal to the display system and the interface counter means.

35. In a device for generating signals from an encoded document as described in claim 34 wherein said process generator means further included translator means comprising:
 a. read only memory means operative to receive the outputted signal from said interface counter means, for outputting a parallel signal;
 b. address counter means operative to receive the clock signal from said time generator means for parallel outputting to said read only memory means a fixed address through the count cycle of said address counter means, and for serially outputting a top of count signal; and
 c. parallel to serial shift register means operative to receive the parallel output signal from said read only memory means for encodable conversion to a serial output signal for inputting as the video input to the display system when clocked at the same rate as said time generator means.

36. In a device for generating signals from an encoded document as described in claim 35 wherein said translator means further comprises:
 a. switching means for outputting unique signals indicative of one of OCR and MICR operative upon manual selection through said switching means thereof; and
 b. gating means upon concurrent receipt of output from said interface counter means and said switching means for outputting unique signals to said read only memory means indicative of one of OCR and MICR operation.

37. In a device for generating signals from an encoded document as described in claim 36 wherein said switching means is a grounded SPDT switch.

38. In a device for generating signals from an encoded document as described in claim 36 wherein said gating means is a pair of AND gates.

39. In a device for generating signals from an encoded document as described in claim 35 wherein said storage means further comprises:
 a. third gating means for outputting a signal to said shift register means for enabling said shift register shift out output signal upon concurrent receipt of signals from the high state of said second flip flop, from the output of said time generator means and from said address counter means when clocked at the same rate as said time generator means;
 b. fourth gating means for outputting an input enabling signal to said interface counter means upon the concurrent receipt of signals from said shift register means indicating stored data therein and from the output of said address counter means; and
 c. fifth gating means for outputting a signal to said second gating means upon the concurrent receipt of signals from said fourth gating means and the low state output of said first flip fop.

40. In a device for generating signals from an encoded document as described in claim 39 wherein said third gating means is an AND gate.

41. In a device for generating signals from an encoded document as described in claim 39 wherein said fourth gating means is a NAND gate.

42. In a device for generating signals from an encoded document as described in claim 39 wherein said fifth gating means is a NAND gate.

* * * * *